United States Patent [19]

Rode

[11] Patent Number: 4,655,255
[45] Date of Patent: Apr. 7, 1987

[54] ELECTROMAGNETICALLY-OPERATED MULTI-WAY VALVE

[75] Inventor: Konrad Rode, Seelze, Fed. Rep. of Germany

[73] Assignee: WABCO Westinghouse Fahrzeugbremsen GmbH, Hanover, Fed. Rep. of Germany

[21] Appl. No.: 819,446

[22] Filed: Jan. 16, 1986

[30] Foreign Application Priority Data

Jan. 19, 1985 [DE] Fed. Rep. of Germany ....... 3501708

[51] Int. Cl.$^4$ ............................................. F16K 11/10
[52] U.S. Cl. ............................. 137/627.5; 137/596.17
[58] Field of Search ................. 137/595, 596.17, 627.5

[56] References Cited

U.S. PATENT DOCUMENTS

| | | | |
|---|---|---|---|
| 2,935,091 | 5/1960 | Wisman | 137/627.5 |
| 3,842,860 | 10/1974 | Stampfli | 137/596.17 |
| 3,989,063 | 11/1976 | Brouwers | 137/596.17 |
| 4,559,971 | 12/1985 | Bradshaw | 137/596.17 |
| 4,580,598 | 4/1986 | Itoh | 137/596.17 |

Primary Examiner—Robert G. Nilson
Attorney, Agent, or Firm—G. E. Hawranko

[57] ABSTRACT

The invention relates to an electromagnetically-operated multi-way valve, which exhibits two valves (an inlet and an outlet) opposite one another. Corresponding to each of the two valves, there is an armature which interacts with a coil, located between the two valves. A coil bracket, disposed through the coil, has a passageway which, upon certain valve conditions, allows communication from the inlet valve to the outlet valve. One of the two valves can be activated against the force of a first spring by the first armature, and the other of the two valves can be activated against the force of a second spring by the second armature. The two springs are designed so that different magnetic forces are required to operate the two valves. The different magnetic forces are produced by a change of the current flowing in the coil. Since there is a separate armature for each valve, which can be operated by one current-controlled coil, it is possible to operate the two valves independent of one another.

13 Claims, 2 Drawing Figures

ELECTROMAGNETICALLY-OPERATED MULTI-WAY VALVE

BACKGROUND OF THE INVENTION

The invention relates to an electromagnetically-operated multi-way valve, especially of the type where more than one valve arrangement is associated with an armature configuration, whereby the efficient movement of the armature configuration brings about a timely switching action to the number of valve-operating positions.

One type of multi-way valve is known from the German Patent DE-OS No. 2403770. This known electromagnetically-operated multi-way valve exhibits two valve seats, located opposite one another in a valve housing, which form two valves with two corresponding valve bodies (inlet valve—outlet valve). The two valves are located inside an armature, which can be axially displaced in the housing of the multi-way valve against a return force, and which is surrounded by a coil. The return force for the armature is provided by a first spring braced against the valve housing and acting directly on the armature, and a second spring located between the two valve bodies. The second spring thereby primarily has the function of a spreader spring, which pushes the two valve bodies in opposite directions. The first spring, on the other hand, acts as the main spring, the force of which must be overcome when the coil is excited by the magnetic force acting on the armature. In the armature, there is a bracket for the two valve bodies. The bracket is designed so that the two valve bodies can be moved by a predetermined distance in the axial direction in their mountings on the bracket.

When there is no power to the coil, the inlet valve is in the open position and the outlet valve is in the closed position. If a partial current is imparted to the coil, the armature is moved against the force of the first spring toward the inlet valve seat. The inlet valve body, acted on by the second spring, is pushed against the inlet valve seat. The inlet valve is now closed. The outlet valve remains closed on account of the force of the second spring acting on the outlet valve body. If the current in the coil is increased, then the armature is moved by the stronger magnetic force against the force of the first spring farther toward the inlet valve seat. The outlet valve body is lifted up from the outlet valve seat by the bracket which simultaneously acts as a driver against the force of the second spring. The outlet valve is now open and the inlet valve remains closed.

This known current-controlled, electromagnetically-activated multi-way valve has the disadvantage that it is relatively complicated. Since the armature is used to activate both valves (inlet valve and outlet valve) and forms one component together with the bracket for the valve bodies, the valve bodies themselves and the second spring, it exhibits a large mass to be accelerated, which has a negative effect on the switching action (relatively large switching hysteresis). To activate this multi-way valve, relatively large magnetic forces are necessary, i.e., relatively high currents.

SUMMARY OF THE INVENTION

The object of the invention is the creation of an electromagnetically-operated multi-way valve of the type described above, which is simple in design and can be switched rapidly.

A further object of the invention is to provide an electromagnetically-operated multi-way valve, whereby the valve body members of two separate valves are formed, using valve activation elements which are actuated using minimal force, thereby assuring an efficient switching action.

Yet a further object of the invention is to provide an electromagnetically-operated multi-way valve, which is simple in design, and which can be switched very rapidly as a result of the reduction of the armature mass and the shortening of the armature stroke. Since separate armatures are assigned to the inlet valve and the outlet valve, with each armature mechanically independent of the other armature and able to assume two positions, armatures can be used which have a very low mass to be accelerated. The magnetic forces to be applied for the activation of the armature, and thus also the currents required, can be kept very low. The opening or closing forces of each valve (inlet valve—outlet valve) can be adjusted as a function of the application at hand by modifying the current levels and the corresponding return forces, e.g. springs.

Briefly, the invention consists of a coil coaxially-disposed within a valve housing and having a coil bracket coaxially-disposed therethrough. End covers, made of ferromagnetic material, enclose the coil and allow actuation of first and second armatures disposed respectively adjacent each of the two end covers. Two biasing springs of differing spring constants urge the two armatures into respective first conditions when the coil is deenergized. A passageway, formed through the coil bracket, allows fluid communication from the inlet valve to the outlet port, to the consumer or to the outlet valve, for return depending on the energization condition of the coil. The biasing spring, associated with the first armature or inlet valve portion, has the lesser spring coefficient, therefore providing that the inlet valve operates first, or under lower current levels to the coil.

DESCRIPTION AND OPERATION

Figure 1:
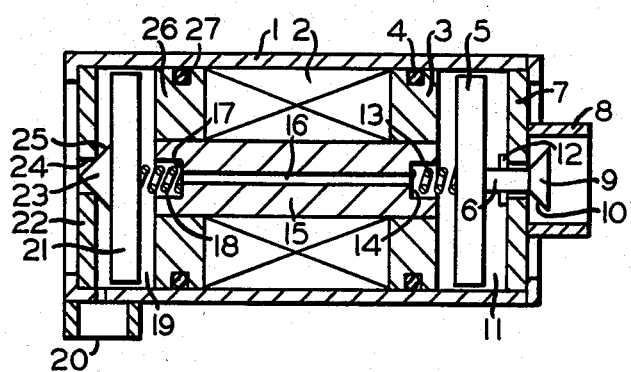
FIG. 1 is an elevational view, in section, of a 3/2-way valve with two armatures, which can be operated by means of a current-controlled coil.

FIG. 1 shows a 3/2-way valve which exhibits a pressure inlet B, a pressure outlet 20 connected to a consumer (not shown), and a pressure outlet 24 leading to the atmosphere. If the valve in question is a 3/2-way valve which is to be used in hydraulic installations, the pressure outlet 24 is connected to a return. The pressure inlet 8 and the pressure outlet 24 are located on first and second end covers 7 and 22 of the valve housing 1 opposite one another. The pressure outlet 20, leading to the consumer (not shown), is on the side wall of the housing 1. In the valve housing 1, there is a coil 2 mounted on a coil bracket 15. The end surfaces of the coil 2, facing away from one another, are bordered by a first plate 3 and a second plate 26, which consist of ferromagnetic material and are connected to the coil bracket 15.

The coil 2 which, together with the coil bracket 15 and the two plates 3, 26, forms a single structure and is located in the valve housing 1, so that the first plate 3 with the first cover 7, exhibiting the pressure inlet 8 and the wall of the valve housing, establishes a first chamber 5 serving as a pressure inlet chamber 11; while the second plate 26, with the second cover 22, exhibiting the pressure outlet 24 and the wall of the valve housing, establishes a second chamber serving as a pressure outlet chamber 19.

There is a passage 16 in the coil bracket 15, running in the longitudinal direction of the coil bracket 15, which exhibits, in both end regions of the coil bracket 15, first and second expansions 14 and 17, designed as graduations. The first end cover 7, exhibiting the pressure inlet 8, is provided with a passage which is designed as an inlet valve seat 10. A first valve body 9 is in communication by means of a valve tappet 6 with a first armature 5, preferably in the form of a disc, located in the pressure inlet chamber 11. The first valve body 9 forms, with the inlet valve seat 10, an inlet valve 9, 10. A first spring 13, braced against the first graduation 14 of the passage 16 in the coil bracket 15, pushes the first armature 5, and thus also the first valve body 9, in the opening direction of the inlet valve 9, 10. On the valve tappet 6, there is a pin 12, serving as a stroke-limiter for the inlet valve body 9, so that when there is no power to the coil 2, the pin 12 is in contact with the first end cover 7.

In the pressure outlet chamber 19, there is a second armature 21, preferably in the shape of a disc, which on its side facing the pressure outlet 24, has an outlet valve body 23. The outlet valve body 23 forms, together with an outlet valve seat 25 on the pressure outlet 24, an outlet valve 23, 25. A second spring 18 is braced against the second graduation 17 of the passage 16 in the coil bracket 15, and pushes the second armature 21, and thus the outlet valve body 23, in the closing direction of the outlet valve 23, 25.

The coil 2, and thus also the coil bracket 15, equipped with the first and second plates 3, 26, are fastened in the valve housing 1 so that they cannot be displaced either by the pressure or by the movement of the two armatures 5, 21. The first spring 13 corresponding to the first armature 5, and the second spring 18 corresponding to the second armature 21, are designed with different strengths so that different magnetic forces are necessary for the operation of the two valves.

When a partial current is imparted to the coil 2, the force of the first spring 13 is overcome by the magnetic force exerted on the first armature 5, and thus the first armature 5, connected with the inlet valve body 9, is moved toward the first plate 3 of the coil 2, whereupon the inlet valve 9, 10 moves into the closed position. Since the second spring 18 is designed to be stronger than the first spring 13, the magnetic force exerted on the second armature 21 cannot overcome the force of the second spring 18. The outlet valve body 23, connected with the second armature 21, continues to be held to the outlet valve seat 25. This means that when a partial current is imparted to the coil 2, the inlet valve 9, 10 assumes the closed position and the outlet valve 23, 25 remains closed.

If the outlet valve 23, 25 is placed in the open position, the current in the coil 2 is increased. The magnetic force is now so large that it also overcomes the force of the second spring 18, exerted in the opposite direction on the second armature 21, and the second armature 21 is moved toward the second plate 26. The outlet valve body 23, connected with the second armature 21, is lifted up from the outlet valve seat 25. The outlet valve 23, 25 is now opened, and the inlet valve 9, 10 remains closed.

With the electromagnetically-operated multi-way valve described above, when this multi-way valve is used in an anti-locking brake system, for example, the following pressure characteristics can be achieved.

Pressurization: No current to coil 2, the inlet valve 9, 10 is open, and the outlet valve 23, 25 is closed.

Maintain pressure: A partial current is imparted to the coil, the first armature 5 places the inlet valve 9, 10 in the closed position; the second armature 21 is still not moved, so that the outlet valve 23, 25 remains in the closed position.

Decompression: The current in the coil 2 is increased, the second armature is moved by the resulting higher magnetic force in the opening direction of the outlet valve 23, 25, and the outlet valve 23, 25 moves to the open position. The inlet valve 9, 10 remains in the closed position.

The first armature 5 and the second armature 21 are designed so that they are guided in the valve housing 1 and exhibit passages for the transport of the pressure medium from the pressure inlet chamber 11, via the passage 16 of the coil bracket 15, to the pressure outlet chamber 19 or from the pressure outlet chamber 19 to the pressure outlet 24.

Naturally, it is also possible for the armature, instead of being shaped in the form of a disc, to be shaped in the form of a tubular body, which is guided in the passage 16 of the coil bracket 15.

Figure 2:
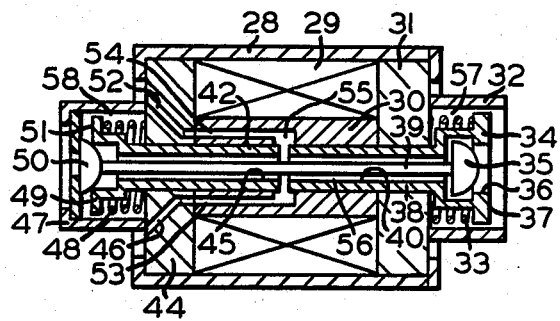
FIG. 2 is an elevational view, in section, of an alternative embodiment of a 3/2-way valve for hydraulic installations with two armatures which can be operated by means of a current-controlled coil and which is equipped with pressure equalization.

FIG. 2 shows a 3/2-way valve, which exhibits a pressure inlet 32, 36, two pressure outlet ports 46, 52 which are connected to consumers (not shown), and a pressure outlet 47, 51 which is connected to a return. The pressure inlet 36, 32 and the pressure outlet 47, 51 are located on opposing first and second end covers 31, 44 of the valve housing 28. The pressure outlet ports 46, 52, leading to the consumer (not shown), are located in the second end cover 44 corresponding to the pressure outlet 47, 51. In the valve housing 28, there is a coil 29 mounted on a coil bracket 30. The end surfaces of the coil 29, facing away from one another, are limited by the two end covers 31, 44, which themselves consist of ferromagnetic material. The coil bracket 30, the coil 29, and the two covers 31, 44 are formed as one component.

The coil bracket 30 exhibits a graduated passage 40, running in the direction of its longitudinal axis. In the portion 40 of the passage 40, which corresponds to the pressure inlet 32, 36, a first armature 38, designed as a tubular body, is inserted. A second armature 42, 49, designed as a tubular body, is inserted in the region of the graduated passage 40, which corresponds to the pressure outlet 47, 51.

The pressure inlet 32, 36 exhibits a pressure inlet chamber 57, and the pressure outlet 47, 51 exhibits a pressure outlet chamber 58. The portion of the first armature 38, projecting into the pressure inlet chamber 57, has a cup-shaped expanded portion, which serves as the inlet valve body 34, 37; and together with a ceramic ball 35, serving as an inlet valve seat located inside the cup-shaped expansion of the first armature 38, forms an inlet valve 34, 37, 35. The portion of the second armature 42, projecting into the pressure outlet chamber 58, also has a cup-shaped expansion, which serves as an outlet valve body 49. The outlet valve body 49 forms, together with a second ceramic ball 50, which is fastened in the pressure outlet 47, 51, an outlet valve 49, 50. The first certamic ball 35 serving as the inlet valve seat 35, and the second ceramic ball 50 serving as the outlet valve seat 50, are connected with one another by means of a rod 39. The first armature 38 is placed by a first spring 33, braced against the first end cover 31, in the opening direction of the inlet valve 35, 37. The second armature 42 is pushed by a second spring 48, which is braced on the second end cover 44, in the closing direction of the outlet valve 49, 50. There are ducts 53, 54 in the coil bracket 30 and in the second end cover 44, which lead to the pressure outlet ports 46, 52.

The ducts 53, 54 are in communication with an annular duct 55 in the coil bracket 30, which annular duct 55 is again in communication with the passages 45, 43 in the armatures 38, 42, designed as tubular bodies.

The operation of the above-described multi-way valve will be explained in greater detail below.

When there is no current to the coil, the inlet valve 37, 35 and the outlet valve 49, 50 are in the position illustrated, that is, the inlet valve 37, 35 is open and the outlet valve 49, 50 is in the closed position. Fluid pressure flows through the pressure inlet 36, 32, the open inlet valve 37, 35, the passage 45 of the first armature 38, and the annular duct 55 and the ducts 53, 54 to the pressure outlet ports 46, 52. At the same time, there is also fluid pressure in the passage 43 of the second armature 42, and thus also at the closed outlet valve 49, 50. The first armature 38 and the second armature 42 are decompressed, since the effective surfaces of the armature 38, 42, opposite one another, are designed so that they are equally pressurized by the fluid pressure, and therefore the forces exerted by the fluid pressure on the two armatures 38, 42 are in equilibrium.

If a partial current is applied to the coil 29, then the first armature 38 is moved against the force of the first spring 33 toward the first end cover 31, whereupon the inlet valve body 37 is applied against the inlet valve seat 35 and the inlet valve 37, 35 closes. Since the second spring 48, corresponding to the second armature 42, is stronger than the first spring 33 corresponding to the first armature 38, the initial magnetic force cannot overcome the force of the second spring 48 corresponding to the second armature 42. The outlet valve 49, 50, therefore, remains closed. The fluid pressure in the consumers (not shown) is maintained. If the current in the coil 29 is increased, then the magnetic force also increases. The second armature 42 is moved against the force of the second spring 48 toward the second end cover 44, and the valve body 49 is raised up from the valve seat 50. The outlet valve 49, 50 is now open and the inlet valve 37, 35 remains in the closed position. Fluid pressure now flows from the consumers (not shown) via the pressure outlet ports 46, 52, the ducts 53, 54, the annular duct 55 and the passage 43 in the second armature 42, to the pressure outlet 47, 51, and thus to the return. The pressure in the consumers (not shown) is thereby reduced.

If the current in the coil 29 is reduced by a partial amount, the magnetic force is also reduced. The force of the second spring 48 overcomes and moves the second armature 42 toward the outlet valve seat 50. The outlet valve 49, 50 closes. Since the remaining magnetic force is sufficient to hold the first armature 38, the inlet valve 37, 35 remains in the closed position. The inlet valve 37, 35 and the outlet valve 49, 50 are closed, and the fluid pressure in the consumers (not shown) is maintained. If the current is removed from the coil 29, the first armature 38 is moved by the force of the first spring 33, away from the inlet valve seat 35. The inlet valve 37, 35 assumes the open position, and fluid pressure is again injected into the consumers (not shown).

Although the hereinabove-described form of the embodiments of the invention constitute preferred forms, it can be appreciated that modifications can be made thereto without departing from the scope of the invention, as set forth in the appended claims.

I claim:

1. An electromagnetically-operated multi-way valve, having at least two valve arrangements, comprising:
   (a) a valve housing;
   (b) a coil disposed within said housing;
   (c) a first armature, operable upon energization of said coil such that, at least one of the at least two valve arrangements can be actuated against a first force exerted by a valve urging means;
   (d) said valve urging means, connected to said at least one of the at least two valve arrangements, being effective for holding said at least one valve arrangement in a first position during deenergization of said coil;
   (e) a second armature operable uon energization of said coil such that another one of the at least two valve arrangements can be actuated against a second force exerted by a second valve urging means;
   (f) said second valve urging means, connected to said another one of the at least two valve arrangements, being effective for holding said another one of the valve arrangements in a first position during deenergization of said coil;
   (g) said first armature and said second armature being disposed in opposing relation to one another at opposite first and second ends of said coil such that, said first and second armatures can operate and be activated independent of one another;
   (h) such first force and such second force, associated respectively with said valve urging means and said second valve urging means, differing in magnitude such that, said at least one valve arrangement and said another valve arrangement are operated at different times and under different energization conditions of said coil; and
   (i) said valve urging means including a first valve spring, and said second valve urging means including a second valve spring, said first valve spring and said second valve spring having different spring constants, thereby effecting such difference in magnitude between such first force and such second force, and requiring different levels of current through said coil to actuate, respectively, said first and said second armatures to overcome such differing spring forces.

2. An electromagnetically-operated multi-way valve, as set forth in claim 1, wherein said at least one valve arrangement is a first, inlet valve, and said another valve arrangement is a second, outlet valve, disposed in said valve housing in opposing relation to said first inlet valve.

3. An electromagnetically-operated multi-way valve, as set forth in claim 1, wherein said coil exhibits a coaxial passageway formed along the longitudinal axis thereof, said multi-way valve further comprising a coil bracket coaxially-disposed within said coaxial passageway formed in said coil, a first end cover disposed adjacent said first end of said coil, and a second end cover disposed adjacent said second end of said coil, said first and second end covers being of sufficient size to enclose said coil therebetween.

4. An electromagnetically-operated multi-way valve, as set forth in claim 3, further comprising a first inlet chamber, formed in said valve housing and bounded on one portion by said first end cover, and a second outlet chamber formed in the opposite end of said valve housing as said first inlet chamber, said second outlet chamber being bounded on one portion by said second end cover, said first inlet chamber being in fluid communication, at times, with said second outlet chamber through a second passageway coaxially formed in said coil bracket.

5. An electromagnetically-operated multi-way valve, as set forth in claim 3, wherein said first and second end covers are composed of a ferromagnetic material such that, said first and second armatures can be actuated therethrough upon energization of said coil, said first and second armatures being essentially disc-shaped.

6. An electromagnetically-operated multi-way valve, as set forth in claim 3, further comprising a first annular sealing gasket, disposed on said first end cover and being effective such that, said coil is sealed against fluid communication with said first inlet chamber and a second annular sealing gasket disposed on said second end cover and being effective such that said coil is sealed against fluid communication with said second outlet chamber.

7. An electromagnetically-operated multi-way valve, as set forth in claim 3, wherein said first inlet valve is formed by a first valve body secured to said first armature and a first valve seat formed around a pressure inlet, and wherein said second outlet valve is formed by a second valve body secured to said second armature and a second valve seat formed around a pressure outlet.

8. An electromagnetically-operated multi-way valve, as set forth in claim 7, wherein said first valve body and said second valve body are secured respectively, to said first and second armatures in essentially a coaxial manner, and further, wherein said pressure inlet and said pressure outlet are formed coaxially at opposing ends of said valve housing.

9. An electromagnetically-operated multi-way valve, as set forth in claim 1, wherein said first spring, associated with said first inlet valve, has a smaller spring coefficient than said second spring, associated with said second outlet valve, thereby allowing operation of said first inlet valve under a lower energization condition imposed on said coil.

10. An electromagnetically-operated multi-way valve, having at least two valve arrangements, comprising:
  (a) a valve housing;
  (b) a coil disposed within said housing;
  (c) a first armature, operable upon energization of said coil such that, at least one of the at least two valve arrangements can be actuated against a first force exerted by a valve urging means;
  (d) said valve urging means, connected to said at least one of the at least two valve arrangements, being effective for holding said at least one valve arrangement in a first position during deenergization of said coil;
  (e) a second armature operable upon energization of said coil such that another one of the at least two valve arrangements can be actuated against a second force exerted by a second valve urging means;
  (f) said second valve urging means, connected to said another one of the at least two valve arrangements, being effective for holding said another one of the valve arrangements in a first position during deenergization of said coil;
  (g) said first armature and said second armature being disposed in opposing relation to one another at opposite first and second ends of said coil such that, said first and second armatures can operate and be activated independent of one another;
  (h) such first force and such second force, associated respectively with said valve urging means and said second valve urging means, differing in magnitude such that, said at least one valve arrangement and said another valve arrangement are operated at different times and under different energization conditions of said coil; and
  (i) a coaxial passageway formed within said coil and having a coil bracket disposed therein; a second passageway being coaxially formed within said coil bracket, and, further, wherein said first and second armatures are tubular-shaped and are of such a diametrical dimension as to each have a portion disposed partially in said second passageway such that, movement of said first and second armatures occurs in a guided manner.

11. An electromagnetically-operated multi-way valve, as set forth in claim 10, wherein said first and second tubular-shaped armatures each exhibit, at the respective portions extending outward of said second coaxial passageway, first and second cup-shaped expansions which serve as respective first and second valve bodies, said first cup-shaped valve body, associated with said first inlet valve, having formed on the inner portion thereof, a first valve seat; and said second cup-shaped valve body, associated with said second outlet valve, having formed on the inner portion thereof, a second valve seat, said multi-way valve further comprising at least one duct formed in said coil bracket which can communicate fluid pressure from said second coaxial passageway and from respective first and second hollow portions of said first and second tubular-shaped armatures to at least one outlet port.

12. An electromagnetically-operated multi-way valve, as set forth in claim 11, wherein said at least one duct includes at least one longitudinal duct, formed approximately parallel to said second coaxial passageway, and one annular duct, formed in said coil bracket, so as to allow fluid communication between said second coaxial passageway and said at least one longitudinal duct.

13. An electromagnetically-operated multi-way valve, as set forth in claim 12, wherein said at least one output port can be put in fluid communication with said second outlet valve through said at least one longitudinal duct, through said annular duct, and through said hollow portion of said second tubular-shaped armature when said second outlet valve is activated to an open condition and said first inlet valve is in a closed condition; and further, wherein said at least one output port can be put into fluid communication with said first inlet valve through said first hollow portion of said tubular-shaped first armature, through said annular duct, and through said at least one longitudinal duct when said first inlet valve is in an open condition and said second outlet valve is in a closed condition.

* * * * *